United States Patent [19]

Burt

[11] 4,403,758

[45] Sep. 13, 1983

[54] WASTE PIPE SUPPORT APPARATUS

[76] Inventor: Howard N. M. Burt, P.O. Box 478, Osoyoos, B.C., Canada

[21] Appl. No.: 307,113

[22] Filed: Sep. 30, 1981

[51] Int. Cl.³ ............................................. F16L 3/00
[52] U.S. Cl. ....................................... 248/49; 248/83
[58] Field of Search .................. 248/49, 83, 85, 74 B, 248/188.5; 193/6

[56] References Cited

U.S. PATENT DOCUMENTS

| 215,510 | 5/1879 | Davis et al. | 193/6 |
|---|---|---|---|
| 801,252 | 10/1905 | Koller | 193/6 |
| 839,144 | 12/1906 | Hinchman | 193/6 X |
| 2,262,939 | 11/1941 | Howard | 248/188.5 |
| 2,545,699 | 3/1951 | Johannsen | 248/188.5 |
| 3,168,946 | 2/1965 | Gay | 193/6 |
| 3,169,741 | 2/1965 | Bittner | 248/49 |
| 3,406,933 | 10/1968 | Wait et al. | 248/80 |
| 3,493,204 | 2/1970 | Prouty | 248/49 |
| 3,572,622 | 3/1971 | Smith | 248/49 |
| 3,623,500 | 11/1971 | Hoy | 137/344 |
| 3,730,228 | 5/1973 | Gibbs | 248/49 X |
| 3,809,348 | 5/1974 | Di Laura | 248/49 |
| 3,810,490 | 5/1974 | Ludwick | 138/106 |
| 3,811,462 | 5/1974 | Feliz | 137/344 |
| 3,819,137 | 6/1974 | Smith | 248/49 |
| 4,125,237 | 11/1978 | Haggins | 248/49 |
| 4,169,571 | 10/1979 | Duggan | 248/49 |
| 4,194,711 | 3/1980 | Winton | 248/49 |
| 4,228,978 | 10/1980 | Rand | 248/74 B |

Primary Examiner—William E. Lyddane
Assistant Examiner—Ramón O. Ramírez
Attorney, Agent, or Firm—Schwartz & Weinrieb

[57] ABSTRACT

Waste pipe support apparatus comprises two nested, trough type, semi-cylindrical tubular members which are telescopically slideable relative to each other for providing the apparatus with required extensibility and contractibility. A bail-type support leg structure elevates one end of the apparatus relative to the other end and the local terrain. Bracket stops limit the pivotable movement of the support leg structure in its operative mode so as to provide stability therefor, and a nut-and-bolt/slot mechanism is provided within the trough members for providing infinite telescopic adjustment capabilities to the apparatus in the longitudinal direction. Guide means is also defined between the trough members for facilitating the movement and retention of one member relative to the other member during the aforenoted longitudinal adjustment operation. The bracket structure of the apparatus also provides for elevational adjustment of the bail leg structure.

19 Claims, 3 Drawing Figures

WASTE PIPE SUPPORT APPARATUS

FIELD OF THE INVENTION

The present invention relates generally to support apparatus, and more particularly to support apparatus which is particularly adapted for supporting the sewage or waste pipe, hose, conduit, or the like, extending from the waste line, sewage holding tank, waste storage tank, or the like, of, for example, a house trailer, camper, motorized home, recreational vehicle, or the like, to a sewer head conventionally provided within a trailer park, camping grounds, mobile home park, or the like.

BACKGROUND OF THE INVENTION

Recreational vehicles, motor homes, house tralers, campers, and the like, are of course conventionally equipped with toilet, shower, sink, and other similar facilities from which waste water and other material must be continuously or intermittently discharged. In the past, such vehicles were also conventionally equipped with sewage or waste holding or storage tanks, however, these tanks had to of course be manually emptied on a periodic basis due to the act that the capacity of such tanks was necessarily limited.

Subsequently developed technology eliminated the foregoing disadvantageous waste disposal systems by permitting waste pipes or conduits to be operatively connected at one end thereof to the waste line or waste or sewage tank of the vehicle, while the other end thereof was operatively adapted for connection to a sewer head or the like permanently fixed within the particular trailer park, camp ground location, or the like. In accordance with the mode of operation of these waste discharge systems, the waste hoses or conduits would permit the continuous discharge of waste matter from the vehicle to the camp site sewage head under gravitational conditions, therefore eliminating the need for any manual supervision or operation of any waste matter mechanisms once the hose or conduit was properly connected between the vehicle sewage drain pipe and the camp site sewage head.

In order to permit the continuous operation of such systems under gravitational conditions, however, it was required that the hoses or conduits be properly supported in a downwardly inclined disposition leading from the vehicle drain pipe to the site sewage head despite any terrain characteristics which would militate against such operation. Such support means was especially required in view of the fact that the connecting pipes or conduits were advantageously fabricated as being flexible in structure in order to be selectively bent in both horizontal and vertical planes so as to be universally adaptable for the aforenoted connection between the vehicle sewage drain pipe and the site sewage head despite differing vehicle structure heights, varying distances between the vehicle and the site sewage head, and terrain elevations and obstacles. The flexibility of the connecting pipes or conduits was achieved by fabricating the same from accordion-type structure in order to further provide the conduits with extension or contraction properties for additional universal operative, as well as storage, qualities. As a result of such flexibility properties, the conduits thus would not be self-supportive and merely tended to follow the local camp site terrain, often deleteriously with respect to the gravitational operative mode of the waste discharge system.

The aforenoted subsequently developed waste conduit support structures were, as may be anticipated, of a multitude of diverse designs, and admittedly performed adequately for the predetermined purposes, however, several substantial disadvantages characterized these mechanisms. For example, they were considerably complex in design and extremely expensive to manufacture, particularly to the extent that the market price to consumers necessary to cover such manufacturing costs would not reasonably borne by the consumers, and therefore, such devices have not been commercially successful. Still further, such prior art devices were very cumbersome, difficult to erect, required an inordinate amount of time to erect and disassemble.

OBJECTS OF THE INVENTION

Accordingly, it is an object of the present invention to provide a new and improved waste pipe support apparatus.

Another object of the present invention is to provide a new and improved waste pipe support apparatus which will overcome the various disadvantages of the prior art support means.

Still another object of the present invention is to provide a new and improved waste pipe support apparatus which is relatively simple in its operative construction.

Yet another object of the present invention is to provide a new and improved waste pipe support apparatus which is relatively inexpensive to manufacture.

Still yet another object of the present invention is to provide a new and improved waste pipe support apparatus which is relatively easy to assemble and disassemble.

Yet still another object of the present invention is to provide a new and improved waste pipe support apparatus which is readily portable and storable.

A further object of the present invention is to provide a new and improved waste pipe support apparatus which is capable of supporting the waste pipe leading from a recreational vehicle, motorized home, or the like, to a camp ground or trailer park sewage head site over various terrain elevations without impeding the gravitational operation of the sewage discharge system.

A yet further object of the present invention is to provide a new and improved waste pipe support apparatus which is longitudinally and elevationally adjustable so as to adequately support the flexible waste pipe or conduit in predetermined modes so as to accommodate variations in the terrain topography, terrain obstacles, variations in vehicular structural heights, and the like.

SUMMARY OF THE INVENTION

The foregoing and other objectives are achieved in accordance with the present invention through the provision of a waste pipe support apparatus which comprises two relatively slideable or telescopically disposed, semi-cylindrical tubular members. The members have their openings disposed upwardly in a nested manner so as to support the flexible waste pipe or conduit which is to be disposed within the support apparatus while fluidically interconnecting the drain pipe of the vehicle and the camp site sewage head.

One end of one of the tubular or trough members is provided with a bail-type support leg structure which is pivotably secured thereto so as to be selectively disposed in an operative and a storage position. This leg support structure provides the necessary elevation to one end of the apparatus so as to facilitate the gravitational discharge of the waste matter through the waste pipe or conduit from the vehicle and toward the sewage head, and the elevational disposition of the leg structure is adjustable relative to the tubular support members so as to alter the angle of inclination of the apparatus relative to the ground or terrain.

Infinitely adjustable means is also provided between the two support trough members so as to provide the apparatus with longitudinal adjustment properties for various operative modes as well as storage capabilities. In conjunction with the longitudinal adjustment of the tubular trough members, the opposite end of the aforenoted one of the members is provided with flanged guide means which simultaneously guides and retains the upper edge portions of the second trough member as the latter is longitudinally moved relative to the first trough member when the relative longitudinal or telescopic adjustment of the members is being conducted.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENT

Figure 1:
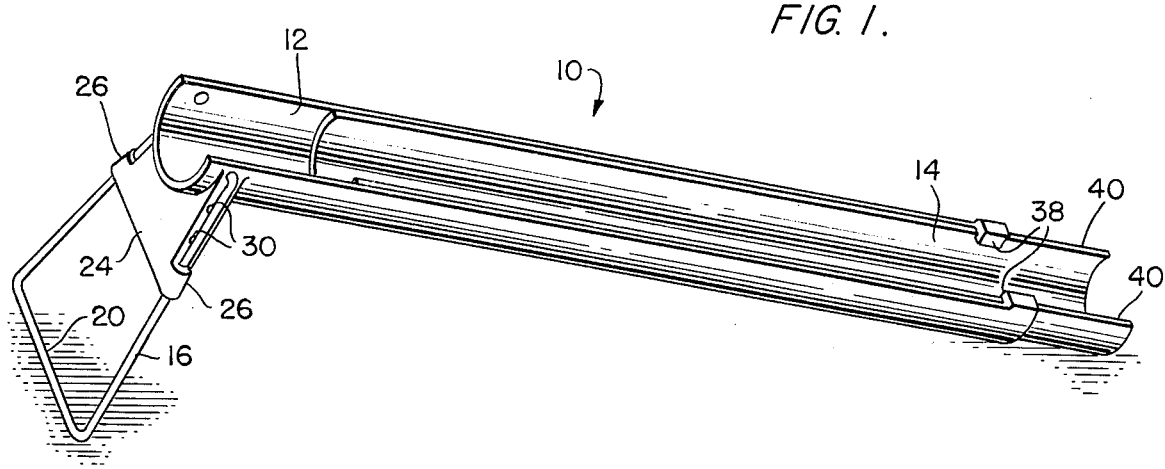
FIG. 1 is a perspective view of the new and improved waste pipe support apparatus of the present invention showing its operative components.

Referring now to the drawings, the waste pipe support apparatus of the present invention is disclosed and generally indicated by the reference character 10. The apparatus is seen to include a first, semi-cylindrical, trough-type support member 12, and a second semi-cylindrical, trough-type support member 14 nested within the first member 12. Each tubular support member is substantially U-shaped in cross-section with the open portions of each member disposed upwardly so as to be receptive to the insertion of the flexible, waste pipe, not shown, therewithin.

Figure 3:
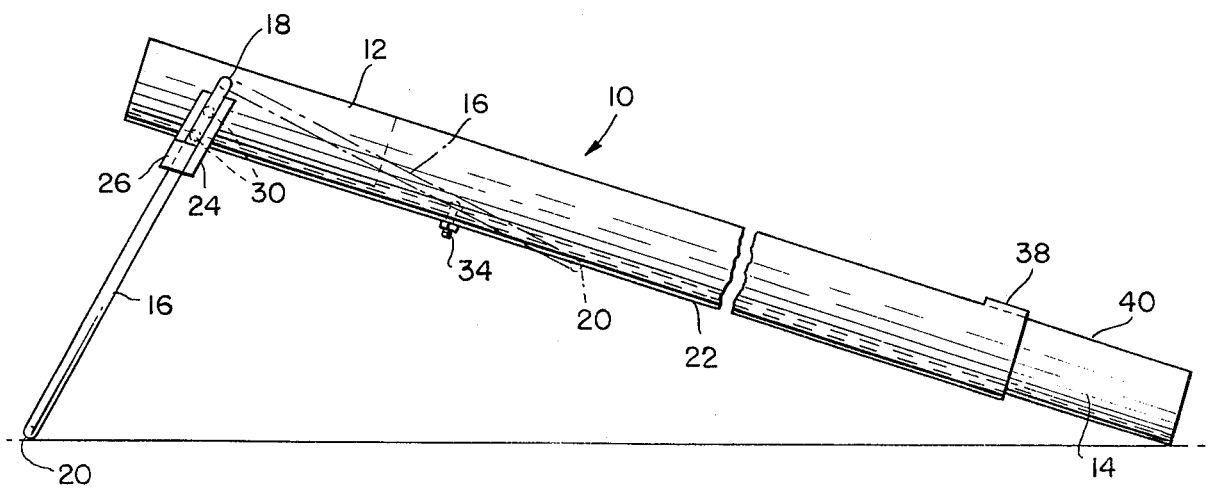
FIG. 3 is a side elevational view of the waste pipe support apparatus shown in FIG. 2.

In operation, one end of the apparatus is adapted to be elevated relative to the other end of the apparatus, as well as with respect to the local terrain or ground, in order to facilitate the gravitational discharge of the waste matter from the vehicle waste drain pipe to the sewage head permanently located within the particular trail park site or camp ground. Accordingly, as viewed in the FIGURES, the left end of the apparatus is provided with a substantially U-shaped bail-type support leg structure 16 which, as best seen in FIG. 3, is pivotably mounted by means of inwardly projecting trunnions 18, provided at the upper end of the leg structure 16, within the first support member 12. The position shown in solid lines in FIG. 3 is of course the operative position of the apparatus whereby the apparatus is properly elevated relative to the local terrain and therefore capable of supporting the flexible waste pipe or conduit, not shown, leading from the vehicle to the site sewage head.

When the apparatus is not being utilized, the pivotable bail leg structure 16 is pivoted to the dotted line position shown in FIG. 3 whereupon the ground-engaging cross-bar 20 abuts the undersurface 22 of first support member 12. This collapsible position of the bail leg structure 16 facilitates storage of the entire apparatus when the apparatus is not being used for its waste pipe support operations.

As may further be appreciated from the FIGURES, the left end of waste pipe support member 12 is also provided with an integral dependent bracket 24 which is integrally formed with the undersurface of member 12. The lowest sidewall portions of the bracket 24 are provided with laterally extending, substantially L-shaped flanged portions 26. These flanges 26 serve as stop members for the bail leg structure 16 when the latter is pivotably moved to its operative position. It is also seen that the plane of the bracket 24, and therefore, the planes of the flanged stop members 26, is inclined rearwardly as one proceeds from the upper part of the bracket to the lower part thereof relative to a vertical plane extending transversely and perpendicular to the longitudinal axis of the support members 12 and 14. In this manner, this relative inclined disposition of the bracket 24, as well as the provision of the stop means 26 thereof, permits the bail leg structure 16 to achieve a rearwardly inclined, locked disposition relative to the apparatus when the leg structure 16 is moved to its operative supporting position. This disposition of the leg structure therefore simply provides the apparatus with the required stability in order to adequately support the waste pipe leading from the vehicle to the camp site sewage head. The locked position of the leg structure 16 will of course be maintained in its operative position due to the inclination of the leg structure relative to the apparatus, particularly under weighted conditions as when the waste pipe, not shown, is disposed within the trough structure comprised by tubular members 12 and 14.

While the trunnions 18 of the bail leg structure are shown disposed within apertures 28 defined within trough support member 12, the sidewalls of bracket 24 are also provided with apertures 30. In this manner, the disposition of the leg trunnions 18 may be selectively adjusted so as to, in turn, adjust the height of the left end of the apparatus relative to the right end thereof which engages the ground or local terrain. In this manner, the relative inclination of the apparatus with respect to the local terrain or ground is adjustable in preselected modes so as to most advantageously affect or determine the gravitational operation of the waste discharge system.

In order to advantageously support the waste pipe, not shown, over an extended distance, at least part of which must be traversed by the waste pipe, not shown, between its connections from the vehicle to the camp site sewage head, the apparatus of the present invention can be extended by means of the telescopic, nested, relative disposition of the two support members 12 and 14. In accomplishing such telescopic extensible adjustment, the lower support member 12 is provided with a longitudinally extending slot 32 within the lowermost or central portion thereof, the slot extending substantially throughout the entire length of the member 12. A bolt and nut assembly 34 is fixedly disposed within an aperture 36 defined within upper nested support member 14 such that the assembly bolt extends downwardly through slot 32 of the lower support member 12. Upon loosening the nut of the assembly 34, it will be appreciated that the upper nested support member 14, along with the nut and bolt assembly 34, will be permitted to slide relative to the lower support member 12, the nut and bolt assembly 34 being guidingly moved within slot 32 of lower member 12.

Figure 2:
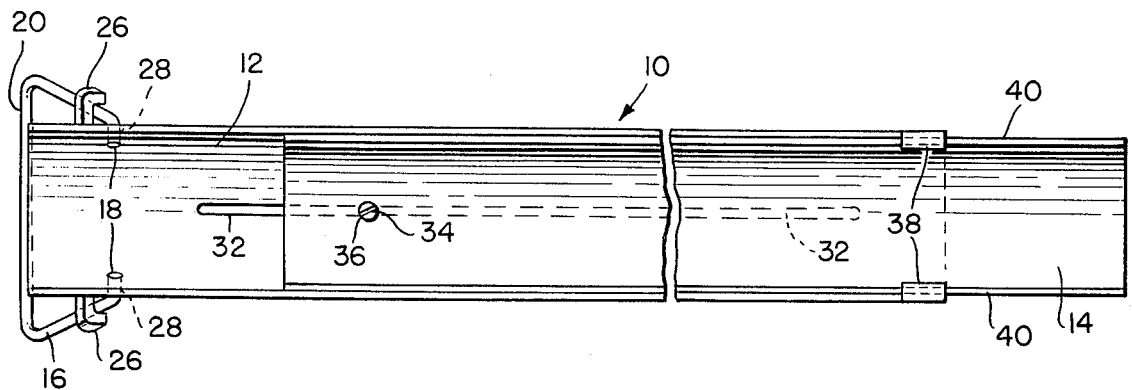
FIG. 2 is a plan view of the waste pipe support apparatus shown in FIG. 1.

It will be further appreciated that as the aperture 36 is defined within the left end portion of upper nested support member 14, this end of trough member 14 is elevationally fixed relative to the lower trough member 12, and as noted hereinabove, the movement of the upper member 14 is guided, relative to the lower member 12, by means of the nut and bolt assembly 34. In order to similarly guide, and elevationally fix, the right portion of the upper trough member 14 relative to the lower trough member 12, particularly during the telescopic adjustment operation, as well as the regular disposition of the trough members during a waste discharge operation, the extreme right end of the lower trough member 12 is provided with inwardly directed flanged elements 38 at the upper edges thereof. As best seen from FIG. 1, the elements have a substantially inverted L-shaped cross-sectional configuration, and in this manner, the elements 38 can engage the upper edges 40 of the upper nested trough member 14. In this manner, as may be best appreciated from FIG. 2, the telescopic adjustment of the nestd support members 12 and 14 relative to each other may be simply and stably accomplished. In lieu of the extensible adjustment of, for example, upper nested member 14 relative to lower nested member 12, the upper nested member 14 may of course be moved longitudinally inwardly relative to lower trough member 12 such that the overall length of the apparatus 10 is diminished. This contraction of the apparatus of course facilitates storage of the apparatus when the same is not being utilized in its support mode in conjunction with the waste pipe, not shown.

Thus, it may be seen that the apparatus of the present invention achieves the various objectives set forth hereinabove. As can be readily appreciated, the entire apparatus of the present invention comprises three major components, that is, the two nest trough-type support members which are telescopically extensible and contractible relative to each other, and the pivotable bail-type support leg structure. The two trough-type support members may of course be easily assembled together initially by engaging the upper edge surfaces 40 beneath the flanged guides 38 of the lower trough member 12, and subsequently aligning the aperture 36 of member 14 with the longitudinal slot 32 of member 12. The nut and bolt assembly 34 may then be inserted within the apparatus so as to fixedly secure the members 12 and 14 together. Once the members 12 and 14 are secured together, they never need to be disassembled under normal operating conditions. If the apparatus is to be disposed in its storage mode, the members 12 and 14 are relatively moved to their contracted positions as facilitated by the nut and bolt assembly 34 slidably disposed within slot 32 of lower trough member 12. Tightening of the nut of assembly 34 will of course longitudinally lock trough member 14 in any one of an infinite number of longitudinal positions relative to trough member 12.

In a similar manner, bail leg structure 16 is disposed in its storage position as shown in the dotted lines of FIG. 3. Leg structure 16 is of course initially mounted upon the apparatus by simply snap-fitting the trunnions 18 within the apertures 28 of member 12, and such leg structure likewise never need be removed from the apparatus apertures 28 except if a height and inclination adjustment is desired to be made whereby the trunnions may be selectively disposed within one of the other sets of apertures 30.

Obviously, many modifications and variations of the present invention are possible in light of the foregoing teachings. It is therefore to be understood that within the scope of the appended claims, the present invention may be practiced otherwise than as specifically described within this patent application specification.

What is claimed as new and desired to be secured by Letters Patent of the United States is:

1. Apparatus for supporting a waste pipe normally interconnecting a vehicle waste drain pipe with a permanent camp site sewage head, comprising:

a first support member for supporting a first portion of said waste pipe;

a second support member for supporting a second portion of said waste pipe, said second member being slideably disposed within said first support member;

leg means pivotably mounted, within a longitudinally extending plane, relative to said first support member so as to be disposed either in an operative or storage position and for supporting said first support member in an elevated position relative to the local terrain upon which said apparatus is to be disposed when said leg means is disposed in said operative position;

bracket means fixedly secured to said first support member;

said leg means being pivotably mounted within said bracket means;

first means defined within said bracket means for selectively mounting said leg means within any one of a multiplicity of positions within said bracket means so as to selectively permit elevational adjustment of said leg means relative to said apparatus; and second means fixedly secured within said bracket means and projecting laterally outwardly therefrom so as to intercept said pivotable leg means within said longitudinally extending plane and thereby block the pivotable movement of said leg means within said longitudinal plane beyond which point said leg means cannot be moved, said point defining said operative position for said leg means.

2. The apparatus as set forth in claim 1, wherein:
said first and second support members comprise trough-type semi-cylindrical tubular members.

3. The apparatus as set forth in claim 2, wherein:
said trough-type support members are disposed in a nested arrangement relative to each other.

4. The apparatus as set forth in claim 1, further comprising:
means for guiding said second support member relative to said first support member when said second support member is being slideably adjusted relative to said first support member.

5. The apparatus as set forth in claim 3, further comprising:
means for guiding said second support member relative to said first support member, and for retaining said second support member in a nested disposition relative to said first support member, when said second support member is being slideably adjusted relative to said first support member.

6. The apparatus as set forth in claim 5, wherein:
said guiding and retaining means comprises flanged means disposed upon said first support member for engaging the upper edge portions of said second support member.

7. The apparatus as set forth in claim 4, wherein:
said guiding means comprises flanged means disposed upon said first support member for engaging said second support member.

8. The apparatus as set forth in claim 1, wherein said interconnecting locking means comprises:
slot means defined within said first support member; and
a nut and bolt assembly disposed within said second support member, said bolt of said assembly being slideably disposed within said slot means of said first support member.

9. The apparatus as set forth in claim 1, wherein:
said leg supporting means is disposed within a plane which is inclined with respect to a plane perpendicular to the local terrain when said leg supporting means is disposed within said operative position.

10. Apparatus as set forth in claim 1, further comprising:
means for guiding substantially the opposite ends of said second support member within said first support member when said second support member is slideably moved within said first support member.

11. Apparatus as set forth in claim 10, wherein:
said guiding means comprises two different types of guide structures.

12. Apparatus as set forth in claim 11, wherein:
one of said guide structures comprises slot means defined within said first support member, and a nut and bolt assembly disposed within said second support member,
said bolt of said assembly being slideably disposed within said slot means of said first support member.

13. Apparatus as set forth in claim 11, wherein:
said other one of said guide structures comprises flanged means disposed upon said first support member for engaging said second support member.

14. Apparatus as set forth in claim 1, further comprising
means interconnecting said first and second support members for lockingly adjusting said first and second support members in any one of an infinite number of positions relative to each other.

15. Apparatus as set forth in claim 1, wherein:
said bracket means is integrally formed with said first support member.

16. Apparatus as set forth in claim 1, wherein:
said bracket means comprises a plate dependently secured to said first support member.

17. Apparatus as set forth in claim 1, wherein:
said first means defined within said bracket means comprises a plurality of lineally aligned apertures.

18. Apparatus as set forth in claim 1, wherein:
said second means fixedly secured within said bracket means comprises ears projecting laterally outwardly from each side of said bracket means.

19. Apparatus as set forth in claim 1, wherein:
said leg means comprises a substantially U-shaped member having laterally inwardly extending free end portions secured within opposite sides of said bracket means.

* * * * *